May 15, 1945.  H. D. HUME  2,375,849
SHOE FOR CUTTER BARS
Filed March 22, 1943

HORACE D. HUME
INVENTOR

BY Herbert E. Smith
ATTORNEY

Patented May 15, 1945

2,375,849

UNITED STATES PATENT OFFICE 2,375,849

SHOE FOR CUTTER BARS

Horace D. Hume, Mendota, Ill.

Application March 22, 1943, Serial No. 479,967

1 Claim. (Cl. 56—303)

This invention relates to improvements in a shoe for cutter bars and more particularly relates to shoes useful for supporting the well-known "floating" cutter bar and for maintaining its proper spacing above a ground surface over which it is passed in a harvesting operation.

The floating cutter bar of the type to which this invention is adaptable is illustrated in U. S. Patent No. 1,996,294 issued April 2, 1935, and No. 2,102,710 issued December 31, 1935, to Horace D. Hume and James E. Love, and comprises a push bar swingably mounted adjacent its rear below suitable framework. On a forward end in advance of the pivotal mounting of the push bar, which is usually used in numbers, is secured a cutter bar that extends laterally to the direction of travel of harvesting mechanism and in turn supports sickle guards and the sickle. Forming either a part of or attached to the push bar is a ground engaging shoe which is intended to slide over the ground surface to determine the spacing of the sickle knives, which are in advance thereof, above the ground and to carry the cutter bar and cutting mechanism from a point rearward of where cutting actually occurs. The equipment of the above mentioned patents is highly useful in most fields to be harvested, and is particularly useful in the harvesting of field peas, either green or dry, and of other types of crops grown under relatively dry conditions. However, it has been found that the use of equipment of the listed patents in the fields having a great deal of moisture in the soil as well as in the vines is somewhat limited. Under such circumstances, it is quite common that the fields are sloppy and muddy and that, due to the weight of the equipment pressing down upon the ground supporting shoes, the soil, and particularly mud, will be pressed up around the edges of the shoes and tend to accumulate and to pack in a manner that is extremely undesirable since it weights the cutter bar and limits the floating action. This is particualrly true where soil contains a heavy clay content or is a black loam comprising little or no humus.

Having in mind the defects of the prior art harvesting equipment, it is an object of this invention to provide a shoe that is not easily clogged in use for cutter bars of the floating type.

Another object of my invention is the provision, in a shoe for cutter bars of the type described, of a self-cleaning member which can be readily passed over the ground surface without accumulating heavy masses of mud or wet soil or other matter to the detriment of the harvesting operation.

A still further and more specific object of my invention is to provide, in a shoe for floating cutter bars, a simple structure that is easily formed and readily attached to the standard equipment now in use in such harvesting mechanisms.

The foregoing objects and others ancillary thereto I prefer to accomplish as follows:

According to a preferred embodiment of my invention, I support a cutter bar and the sickle and sickle guard appurtenances upon a shoe having a streamlined cylindric shape adapted to pass over and through wet or moist soil and vegetation without accumulating a load of such foreign matter. Specifically, the shoe comprises a cylindrical form body having a forwardly extending lug for the purpose of attachment, a runner base that smoothly merges with the cylindrical body and, preferably, a tapered trailing end that permits the shedding of material that might otherwise gather on the shoe. In certain instances, it is important that between the shoe and its point of attachment certain resilience be provided to absorb minor shocks and forces which would otherwise be transmitted to the structure supported by the shoe and possibly impair the harvesting operation. At the same time, it is important that the shoe be so constructed that it will not be deformed should it strike a hard or immovable object, such as stones in the field, but will readily pass over them and continue to adequately perform the desired functions.

I also here disclose a certain modified form of my invention wherein an auxiliary attachment member is provided for engagement over the cutter bar, which member carries a plurality of shoes spaced along its length in accordance with any desired pattern or arrangement to meet any specific condition that is to be encountered and overcome.

The novel features that I consider characteristic of my invention are set forth with particularity in the appended claim. The invention itself, however, both as to its organization and its method of operation, together with additional objects and advantages thereof, will best be understood from the following description of specific embodiments when read in connection with the accompanying drawing, in which Figure 1 is a view in elevation, showing a portion of the operating mechanism of a cutter bar and my shoe for supporting the same;

Figure 1:
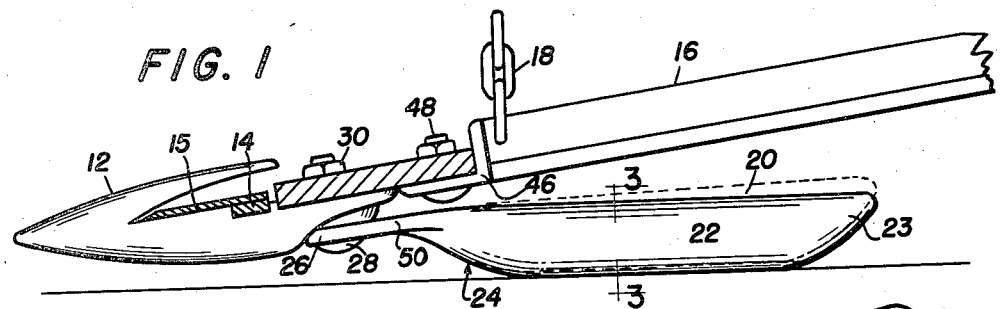
Figure 2:
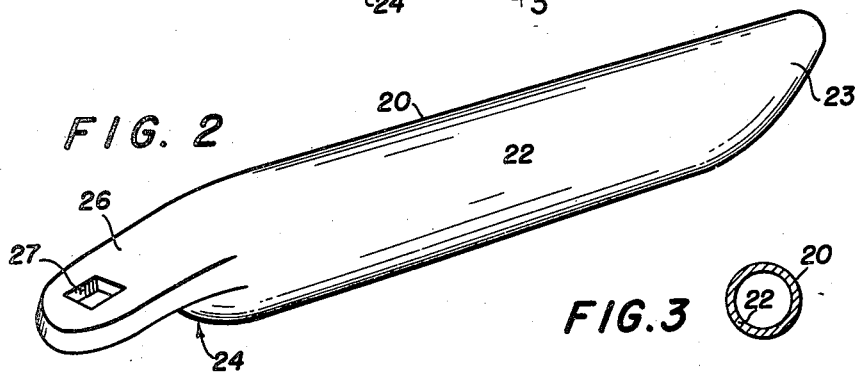
Figure 2 is a perspective view of the shoe for cutter bars.
Figure 3:
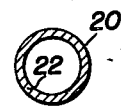
Figure 3 is a sectional view taken on line 3—3 of Figure 1.

A shoe, to support cutter bars and to overcome the defects hereinbefore enumerated, must have at least two totally distinct characteristics: it must be capable of supporting the cutting mechanism and to do so in a manner that will avoid clogging and the accumulation of foreign matter which would impede the operation of a harvester; and under certain circumstances it must provide a resilient support that will prevent the transmission of undesirable forces and shocks to the cutting mechanim. Accordingly, a preferred embodiment of my invention, referring to Figures 1 and 2 of the drawing, is constituted by a cutter bar mechanism which is supported by my novel ground-engaging shoe. The cutting mechanism comprises the cutter bar 10 which is usually a strap of metal that is disposed substantially horizontal to the ground surface and extends laterally across the direction of travel of the harvesting equipment a distance equal to the swath to be cut. At spaced intervals along the cutter bar is mounted a plurality of finger guards 12 of any of the various and well-known types. Cooperating with the finger guards 12 to cut vegetation is the reciprocal sickle bar 14 and the knives 15.

To the rear edge of bar 10, at spaced intervals therealong, is a plurality of push bars 16 which, as is shown in the above-mentioned patent, are pivotally mounted adjacent their rear ends to a supporting driven structure that advances the cutting mechanism over the ground. It is customary to support the push bar, in certain installations, below a draper frame to which vegetation that is harvested by this equipment is passed. The flexible link 18 suspends the forward end of the push bar, the cutter bar, and other appurtenances from such a draper frame in the event that the frame is raised above the ground a distance beyond which the ground-shoe will function.

My ground-supporting shoe is indicated as a whole by the numeral 20 and comprises a cylindrical body portion 22 that has a rear tapered trailing end and, on its forward end, an upturned nosing 24 both of which are preferably curved and smoothly merge into the lower cylindrical curved wall of the body 22. Extending forwardly of the body and above the curved nose is an attaching lug 26 perforated at 27 for the reception of the shank of bolt 28 that is passed through the shank of the finger guard and also through the cutter bar and secured in place by means of nut 30.

Several shoes 20 will ordinarily be mounted throughout the length of the cutter bar in accordance with the conditions over which the harvesting mechanism is to be passed.

Figure 4:
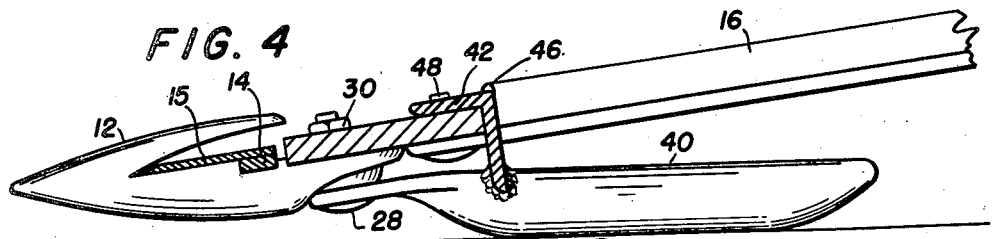
Figure 4 is a plan view similar to Figure 1, but illustrating certain modifications of my invention.
Figure 5:
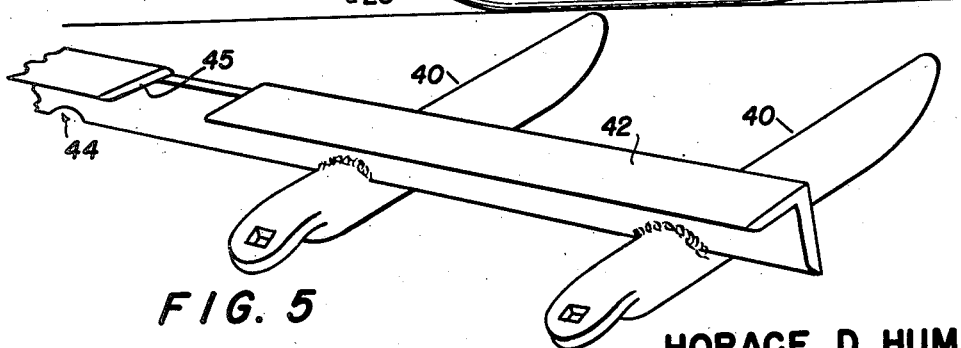
Figure 5 is a fragmentary perspective view of an attaching member used in the structure of Figure 4, and illustrating the manner in which several shoes may be associated together in one structure.

In Figure 4 an alternative arrangement is provided, in which the shoe 40, in all respects similar to shoe 20, is attached to an angle iron 42, usually by welding thereto, in notches 44 that straddle an upper portion of the shoe. The forwardly extending flange of the angle iron 42 passes over the upper rear edge of the cutter bar 10 and prevents the downward misalignment of the shoe with respect to the cutter bar, which is normally quite stiff. A notch 45 is shown in Figure 5 in the angle iron for the accommodation of the forward attaching clip 46, which joins the push bar by means of bolt 48 to the cutter bar. Under certain circumstances the attaching flange 26, at approximately the point indicated by the numeral 50 in Figure 1, may be resilient and springy enough to permit the absorption of hard shocks imparted to the shoe, should it strike a stone in the field, whereby the shoe may deflect upwardly a slight amount and thus prevent its transmission to the harvesting mechanism.

Although I have shown and described certain specific embodiments of my invention, I am fully aware that many modifications thereof are possible. My invention, therefore, is not to be restricted except insofar as is necessitated by the prior art and by the spirit of the appended claim.

I claim:

Ground supporting means for cutter bars, comprising: an angle iron having a forwardly extending flange to engage over the upper rear edge of a cutter bar and a depending leg from said flange, and a shoe of streamline shape secured to the depending leg and having means forward thereof for attachment to the under side of a cutter bar.

HORACE D. HUME.